United States Patent
Hsu et al.

(10) Patent No.: US 7,054,250 B2
(45) Date of Patent: May 30, 2006

(54) METHOD AND DEVICE FOR JITTER ENHANCEMENT IN AN OPTICAL DISC SYSTEM

(75) Inventors: Tse-Hsiang Hsu, Chang-Hua Hsien (TW); Chih-Cheng Chen, Hsin-Chu (TW)

(73) Assignee: MediaTek Inc., Hsinchu Hsien (TW)

( * ) Notice: Subject to any disclaimer, the term of this patent is extended or adjusted under 35 U.S.C. 154(b) by 477 days.

(21) Appl. No.: 10/358,529

(22) Filed: Feb. 5, 2003

(65) Prior Publication Data

US 2004/0057358 A1 Mar. 25, 2004

(30) Foreign Application Priority Data

Sep. 20, 2002 (TW) .............................. 91121647 A (51) Int. Cl.
*G11B 7/00* (2006.01)
(52) U.S. Cl. .............................. 369/53.34; 369/44.36; 369/44.25; 369/47.1; 369/124.14
(58) Field of Classification Search ............ 369/47.17, 369/47.48, 44.25, 44.28, 44.32, 30.15, 30.13, 369/30.17, 53.33, 53.15, 53.34, 44.27, 44.35, 369/44.36, 47.1, 47.18, 47.28, 59.21, 53.21, 369/124.14; 315/291; 318/597; 327/14
See application file for complete search history.

(56) References Cited

U.S. PATENT DOCUMENTS

| | | | | |
|---|---|---|---|---|
| 4,689,779 A | * | 8/1987 | Hayashi et al. | 369/44.32 |
| 5,020,044 A | * | 5/1991 | Shimonou | 369/44.28 |
| 5,675,558 A | * | 10/1997 | Katoh | 369/30.15 |
| 6,097,678 A | * | 8/2000 | Yoshida et al. | 369/47.48 |
| 6,201,417 B1 | * | 3/2001 | Blum et al. | 327/14 |
| 6,411,056 B1 | * | 6/2002 | Ikedo et al. | 318/597 |
| 6,476,683 B1 | * | 11/2002 | Saito et al. | 332/109 |

* cited by examiner

*Primary Examiner*—William Korzuch
*Assistant Examiner*—Kim-Kwok Chu
(74) *Attorney, Agent, or Firm*—Madson & Austin

(57) ABSTRACT

A method and device are provided for jitter enhancement in an optical disc system. The optical disc system generates a signal that includes an effective component having a first slew rate, and a pre-pit component having a second slew rate larger than the first slew rate. The signal is fed to a slew rate control module having a predetermined slew rate that is larger than the first slew rate and smaller than the second slew rate. The slew rate control module outputs a component of the signal having a slew rate not larger than the predetermined slew rate, and suppresses a component of the information signal having a slew rate larger than the predetermined slew rate.

18 Claims, 5 Drawing Sheets

METHOD AND DEVICE FOR JITTER ENHANCEMENT IN AN OPTICAL DISC SYSTEM

CROSS-REFERENCE TO RELATED APPLICATION

This application claims priority of Taiwanese application no. 091121647, filed on Sep. 20, 2002.

BACKGROUND OF THE INVENTION

1. Field of the Invention

The invention relates to a method and device for jitter enhancement in an optical disc system, more particularly to a method and device for extracting a wobble signal that is used to control rotating speed of a spindle motor from an information signal generated in an optical disc system.

2. Description of the Related Art

In the manufacture of CD-R (Compact Disc-Recordable), an optical disc is formed with a shallow spiral groove, otherwise known as a pre-groove. Due to the presence of the pre-groove, a groove track and a land track are rendered on the surface of the optical disc. Similar to hard disks, the tracks on an optical disc are also divided into sectors. In the case of read-only optical discs, each sector contains time-related information for controlling rotating speed of an optical disc system so that data recorded on the optical disc can be read correctly. For the same reason, there is a need to provide a CD-R with means for guiding advancing movement of laser light emitted from an optical pickup head and for accurately controlling rotating speed in an optical disc system. Therefore, the pre-groove formed on the CD-R is not shaped as a perfect spiral curve, but is somewhat wobbled so as to provide both tracking and timing information. The pre-groove wobbles in a sinusoidal manner such that the optical disc system can generate a wobble signal upon detecting the pre-groove. Based on the frequency and amplitude variation of the wobble signal, the read/write speed of the optical disc system can be adjusted for synchronization with the tracks of the CD-R so as to read/write data correctly.

Since the wobbling structure of a pre-groove is made during the manufacturing process, the structure as such is also known as pre-information. However, as more types of optical discs are being manufactured, the pre-information on an optical disc no longer just includes the aforesaid wobbling structure. For example, in DVD-R/RW (Digital Versatile Disc-Recordable/Rewritable), the pre-information further includes a pre-pit for providing information, such as a read/write address and the optimal power of a laser output for the optical pickup head, etc.

Figure 1:
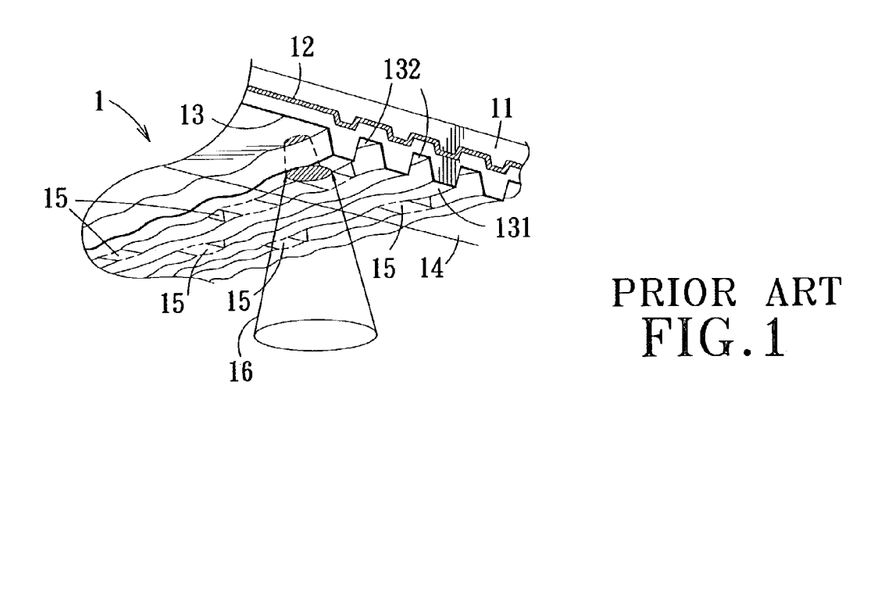
FIG. 1 is a fragmentary perspective view showing one example of a configuration of a DVD-R.

Referring to FIG. 1, a DVD-R 1 is shown to include a protection layer 11, a reflective layer 12, a pigment layer 13, and a substrate layer 14 that protects the pigment layer 13. The pigment layer 13 is formed with a groove track 131 and a land track 132. During the manufacturing process of the DVD-R 1, the groove track 131 is formed as a track wobbled by the frequency corresponding to the rotating speed of the DVD-R 1, whereas the land track 132 is formed with a plurality of pre-pits 15.

Figure 2:
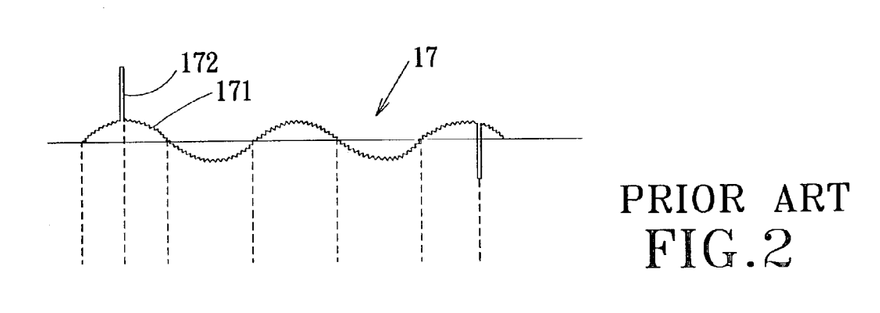
FIG. 2 illustrates an information signal corresponding to the DVD-R of FIG. 1.

As such, when an optical disc system is operated for reading or writing data from/onto the DVD-R 1, a light beam 16 (such as a laser beam) is projected onto the groove track 131 that contains pre-information. Since the diameter of the light beam 16 projected onto the pigment layer 13 is larger than the width of the groove track 131, and since the light beam projected to the reflective layer 12 will be reflected in amounts corresponding to the curvature of the groove track 131, a sinusoidal information signal 17 (as shown in FIG. 2) that corresponds the wobbling structure of the groove track 131 can be obtained. However, due to the effect of the pre-pits 15 on the reflected light beam, noise components (or spikes) 172 corresponding to the pre-pits 15 will be generated within the information signal 17. In other words, the information signal 17 includes a wobble component 171 and a pre-pit component 172. It is noted that only the wobble component 171 is required in the control of the rotating speed of the DVD-R 1 through a spindle motor. Therefore, before the information signal 17 can be sent to a servo circuit that is responsible for controlling the rotation of the spindle motor and the read/write operations, the wobble component 171 must be extracted first (that is, the pre-pit component 172 in the information signal 17 should be removed).

Figure 3:
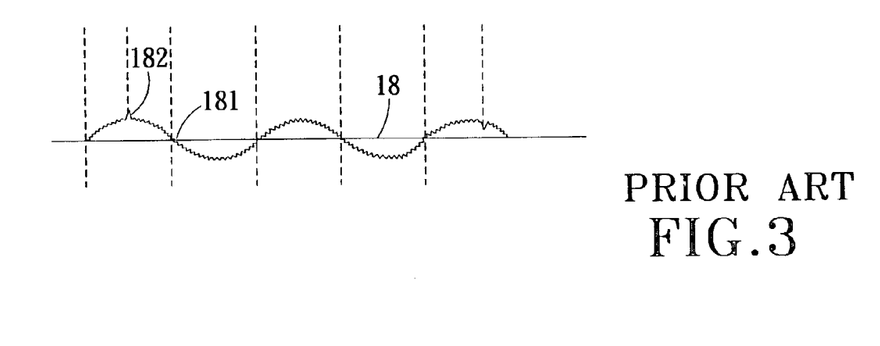
FIG. 3 illustrates an effective wobble signal obtained from the information signal of FIG. 2 after processing by a wobble signal extractor disclosed in U.S. Pat. No. 6,188,655.
Figure 4:
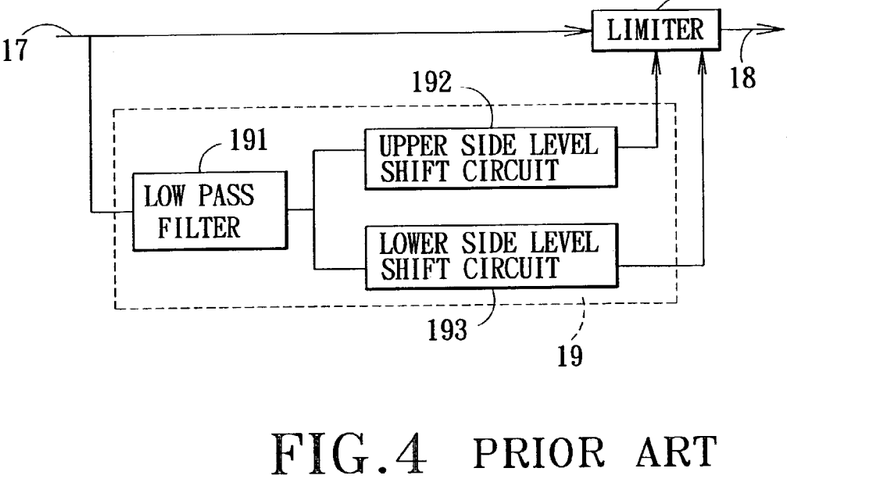
FIG. 4 is a schematic circuit block diagram of the wobble signal extractor disclosed in U.S. Pat. No. 6,188,655.

U.S. Pat. No. 6,188,655 discloses a wobble signal extractor for processing the information signal 17 to result in an effective wobble signal that includes the wobble component 171. Referring to FIG. 4, in the wobble signal extractor, a limit level generator 19 and a limiter 20 are used to suppress most of the pre-pit components 171 of the information signal 17 so as to transform the information signal 17 into an effective wobble signal 18, as shown in FIG. 3. A band-pass filter is then used to remove the remaining pre-pit components 182 so that the output signal only contains the wobble component 181, which is subsequently encoded into a digital signal to be fed to the servo circuit for controlling the rotating speed of the spindle motor.

It is noted that the limit level generator 19 in the aforesaid wobble signal extractor includes components, such as a low pass filter 191, an upper side level shift circuit 192 and a lower side level shift circuit 19. Therefore, the limit level generator 19 and the limiter 20 cooperate to form a complicated and large circuit that is costly and difficult to maintain.

SUMMARY OF THE INVENTION

Therefore, the main object of the present invention is to provide a method and device for jitter enhancement in an optical disc system and capable of overcoming the aforesaid drawbacks associated with the prior art.

According to one aspect of the present invention, there is provided a method for jitter enhancement in an optical disc system. The optical disc system generates a signal that includes a wobble component having a first slew rate, and a pre-pit component having a second slew rate larger than the first slew rate. The method comprises the steps of:

a) providing a slew rate control module having a predetermined slew rate that is larger than the first slew rate and smaller than the second slew rate; and b) feeding the signal to the slew rate control module such that the slew rate control module outputs a component of the signal having a slew rate not larger than the predetermined slew rate, and suppresses a component of the signal having a slew rate larger than the predetermined slew rate.

According to another aspect of the present invention, there is provided a method for extracting a wobble signal from an information signal in an optical disc system. The information signal includes a wobble component having a first slew rate, and a pre-pit component having a second slew rate larger than the first slew rate. The method comprises the steps of:

a) providing a slew rate control module having a predetermined slew rate that is larger than the first slew rate and smaller than the second slew rate; and b) feeding the information signal to the slew rate control module such that the slew rate control module outputs the wobble signal having a slew rate not larger than the predetermined slew rate, and suppresses a component of the information signal having a slew rate larger than the predetermined slew rate.

According to yet another aspect of the present invention, there is provided a method for controlling rotating speed of a spindle motor in an optical disc system. The spindle motor drives an optical disc with a wobbling information track. The method comprises the steps of:

a) through an optical pickup device, generating an information signal that corresponds to the wobbling information track of the optical disc, the information signal including a wobble component having a first slew rate, and a pre-pit component having a second slew rate larger than the first slew rate;

b) feeding the information signal to a slew rate control module having a predetermined slew rate that is larger than the first slew rate and smaller than the second slew rate, the slew rate control module outputting a wobble signal having a slew rate not larger than the predetermined slew rate, and suppressing a component of the information signal having a slew rate larger than the predetermined slew rate; and c) feeding the wobble signal to a servo circuit to control the rotating speed of the spindle motor accordingly.

According to still another aspect of the present invention, there is provided a device for jitter enhancement in an optical disc system. The optical disc system generates a signal that includes an effective component having a first slew rate, and a noise component having a second slew rate larger than the first slew rate. The device comprises:

a slew rate control module having a predetermined slew rate that is larger than the first slew rate and smaller than the second slew rate, the slew rate control module being adapted to be fed with the signal, outputting a component of the signal having a slew rate not larger than the predetermined slew rate, and suppressing a component of the signal having a slew rate larger than the predetermined slew rate.

According to a further aspect of the present invention, there is provided a device for extracting a wobble signal from an information signal in an optical disc system. The information signal includes a wobble component having a first slew rate, and a pre-pit component having a second slew rate larger than the first slew rate. The device comprises:

a slew rate control module having a predetermined slew rate that is larger than the first slew rate and smaller than the second slew rate, the slew rate control module being adapted to be fed with the information signal, outputting the wobble signal having a slew rate not larger than the predetermined slew rate, and suppressing a component of the information signal having a slew rate larger than the predetermined slew rate.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 5:
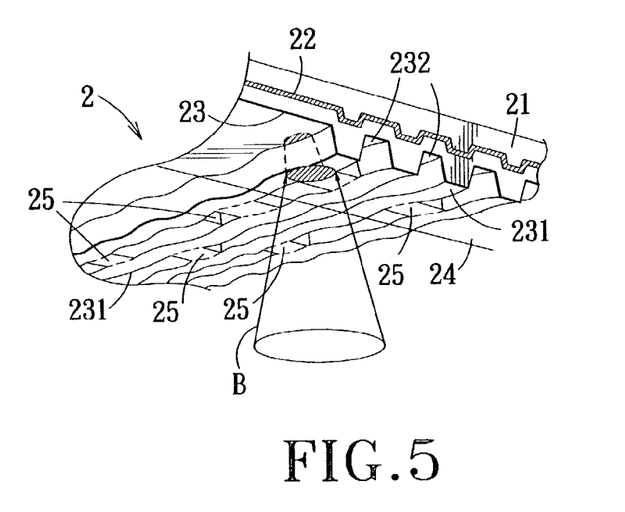
FIG. 5 is a fragmentary perspective view showing one example of a configuration of a DVD-R for use in a preferred embodiment of a device for jitter enhancement in an optical disc system according to this invention.

Referring to FIG. 5, a DVD-R 2 (hereinafter referred to as optical disc) is shown to include a protection layer 21, a reflective layer 22, a pigment layer 23, and a substrate layer 24 that protects the pigment layer 23. The pigment layer 23 is formed with a groove track 231 and a land track 232. As in the foregoing, during the manufacturing process of the optical disc 2, pre-information will be formed on the groove track 231 and the land track 231 to provide information needed for reading/writing by an optical disc system. Therefore, the groove track 231 is formed as a sinusoidal wobbled track, whereas the land track 232 is formed with pre-pits 25. It is worthwhile to note that, although the number and application of layers included in an optical disc may vary in accordance with the specification of the optical disc and the individual manufacturers, it is in general a norm to fabricate pre-information on the pigment layer 23 by wobbling the track and forming pre-pits for providing information, such as timing, address, etc., to the optical disc system so as to enable the latter to read/write the optical disc 2 correctly.

Figure 6:
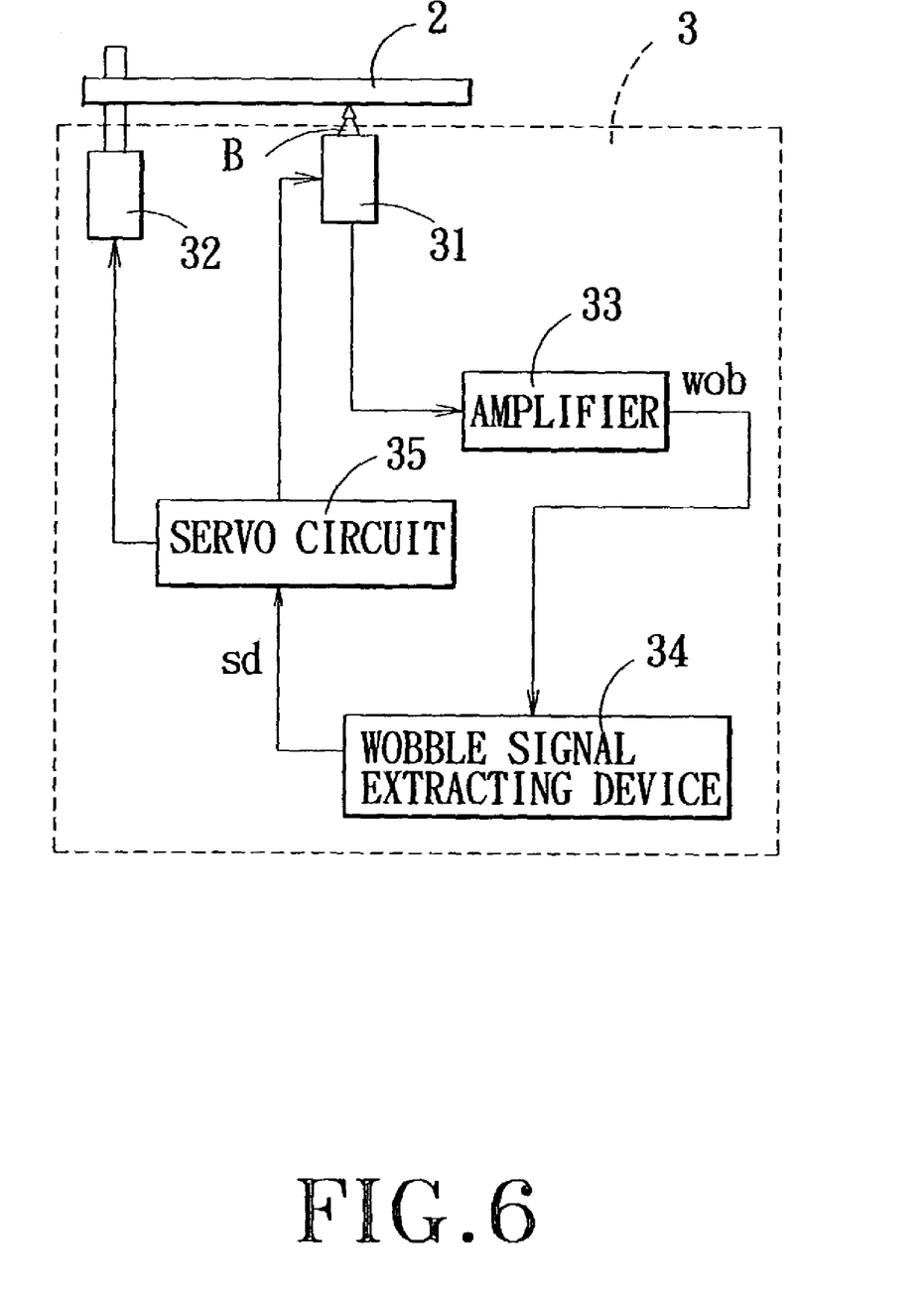
FIG. 6 is a schematic block diagram of an optical disc system that incorporates the preferred embodiment of the present invention.
Figure 7:
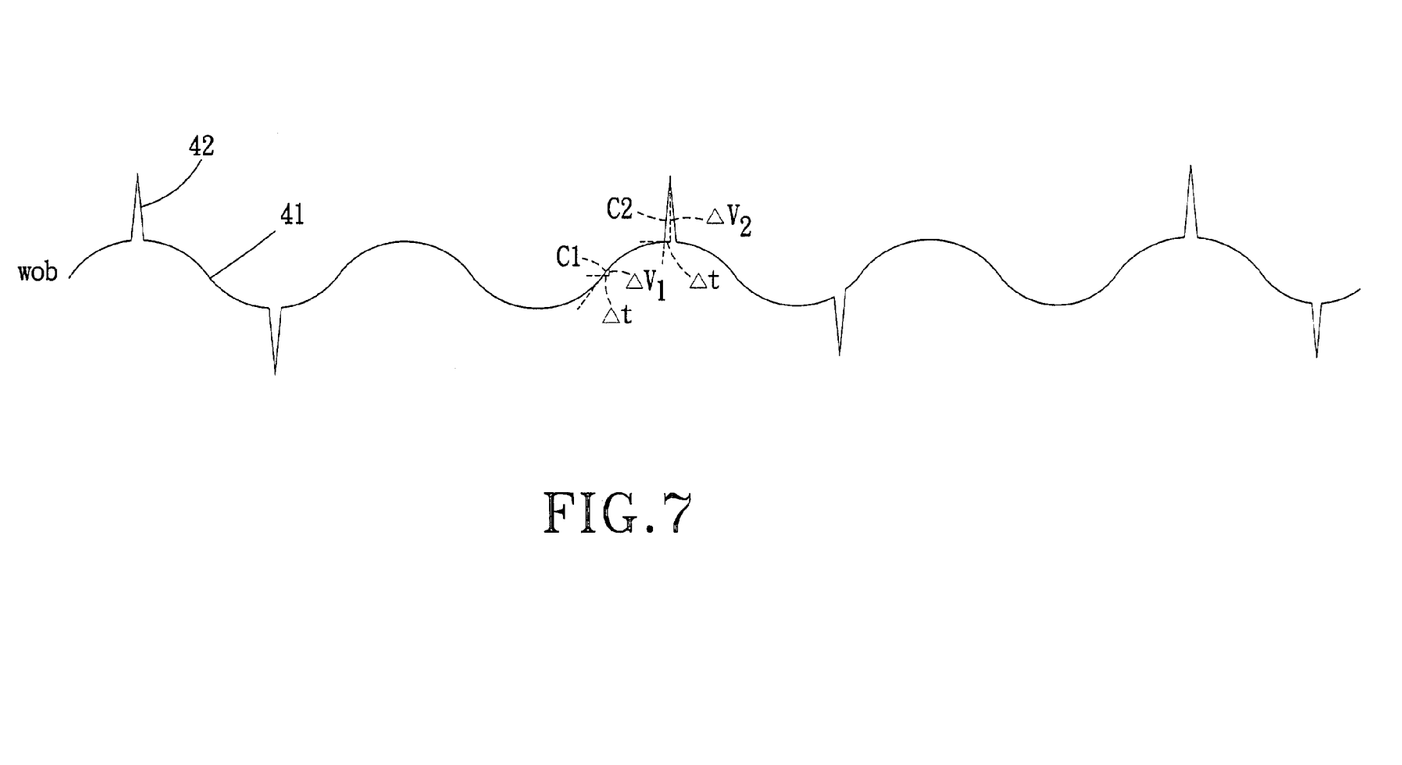
FIG. 7 illustrates an information signal processed by the preferred embodiment of the present invention.

With further reference to FIG. 6, an optical disc system 3 adapted to read/write an optical disc 2 is shown to include an optical pickup device 31, a spindle motor 32 responsible for rotating the optical disc 2, an amplifier 33, a wobble signal extracting device 34, and a servo circuit 35. The optical pickup device 31 includes a light source (such as a laser light source) for emitting a light beam (B) (see FIG. 5) that is projected onto the optical disc 2, an optical lens (or object lens) for focusing the light beam (B), and an optical sensor for sensing reflected light beams. To read the pre-information on the optical disc 2, the light beam (B) is outputted by the optical pickup device 31, and will be reflected back to the optical pickup device 31 by the reflective layer 22. The geometry of the projected locations of the light beam (B) will vary the characteristics of the reflected light beam. As a result, the optical sensor in the optical pickup device 31 will accordingly convert the reflected light beam into a corresponding electric signal that is provided to the amplifier 33 for amplification, thereby resulting in an information signal (wob), as best shown in FIG. 7. Thereafter, through the wobble signal extracting device 34, the desired wobble component will be extracted from the information signal (wob) and encoded as a digital signal (sd) to be fed to the servo circuit 35. The servo circuit 35 controls the rotating speed of the spindle motor 32 and the read/write operations based on the timing information provided by the digital signal (sd) such that the optical disc system 3 can effectively read/write the optical disc 2. It should be noted herein that, in FIG. 6, only the circuit blocks relevant to the extraction of the wobble signal are shown. As known to those skilled in the art, the optical disc system 3 further includes other components, such as power control circuits, decoders, encoders, processors, etc.

FIG. 7 illustrates the information signal (wob) corresponding to the pre-information on the optical disc 2. As shown, the information signal (wob) includes a wobble component 41 that corresponds to the groove track 231 (see FIG. 5), and pre-pit components 42 that correspond to the pre-pits 25 on the land track 232. Since the servo circuit 35 controls the rotating speed of the spindle motor 32 and the read/write operations based on the wobble component 41 of the information signal (Wob), the pre-pit components 42 of the information signal (wob) are signals that have to be removed so as not to adversely affect the quality of reading/writing the optical disc 2. The wobble signal extracting device 34 in this embodiment is operable so as to suppress the pre-pit components 42 of the information signal (wob) In contrast with the upper and lower side level shifting and limiting taught in the prior art, wobble signal extracting in this embodiment is done according to a slew rate control method.

The amplitude of the information signal (wob) varies with the intensity of the reflected light beam. In this embodiment, the amplitude variation is represented in terms of voltage. As implemented in the optical disc 2, the wobbling magnitude is far smaller than the width of the groove track 231, i.e., the wobbling magnitude is only a small percentage of the width. Thus, the intensity of the light beam reflected at a pre-pit location will be much larger than that at locations other than the pre-pits 25 on the land track 232. Therefore, as shown in FIG. 7, when tangential lines (C1), (C2) are formed at locations of a wobble component 41 and a pre-pit component 42, respectively, the slope of the tangential line (C2) will be much larger than that of the tangential line (C1). In other words, during the same unit-time period ($\Delta t$), the voltage change ($\Delta V2$) associated with the pre-pit component 42 will be much larger than the voltage change ($\Delta V1$) associated with the wobble component 41. This means that the voltage slew rate (r2) (r2=$\Delta v2/\Delta t$) of the pre-pit component 42 is much larger than the voltage slew rate (r1) (r1=$\Delta v1/\Delta t$) of the wobble component 41. Therefore, in view of the rather big difference between the voltage slew rates (r2, r1) of the pre-pit component 42 and the wobble component 41, a slew rate control module is employed in the wobble signal extracting device 34 to replace the complicated circuits of the prior art. The slew rate control module has a predetermined slew rate (r3) that is larger than the first slew rate (r1) and smaller than the second slew rate (r2). Accordingly, when the information signal (wob) is fed to the slew rate control module, the component of the information signal (wob) having a slew rate not larger than the predetermined slew rate (r3) will be outputted, whereas the component of the information signal (wob) having a slew rate larger than the predetermined slew rate (r3) will be suppressed.

Figure 8:
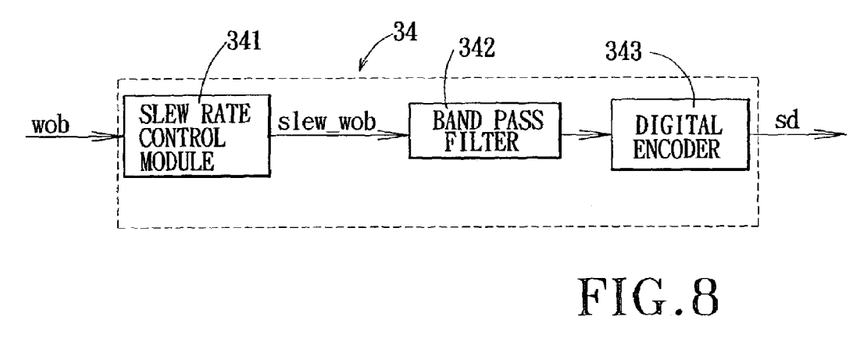
FIG. 8 is a schematic circuit block diagram of the preferred embodiment of a wobble signal extracting device according to the present invention.
Figure 9:
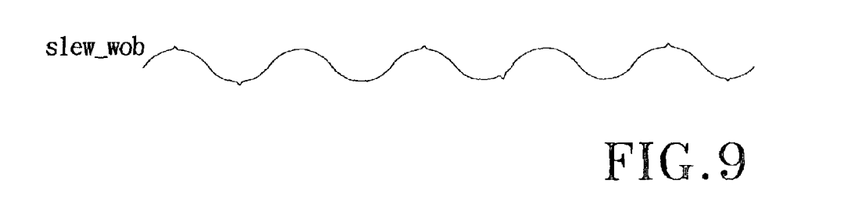
FIG. 9 illustrates an effective wobble signal obtained from the information signal of FIG. 7 after processing by a slew rate control module of the preferred embodiment.

Referring to FIG. 8, the wobble signal extracting device 34 of this embodiment includes a slew rate control module 341, a band-pass filter 342 coupled to the slew rate control module 341, and a digital encoder 343 coupled to the band-pass filter 342. The slew rate control module 341 of this embodiment is adapted to receive the information signal (wob), and has a predetermined slew rate (r3) that is larger than the voltage slew rate (r1) (r1=$\Delta v1/\Delta t$) of the wobble component 41 and smaller than the voltage slew rate (r2) (r2=$\Delta v2/\Delta t$) of the pre-pit component 42 (r1<r3<r2) so as to serve the purpose of removing the pre-pit components 42 in the information signal (wob). Furthermore, to effectively remove most of the pre-pit components 42 in the information signal (wob), the predetermined slew rate (r3) is chosen to be larger than the voltage slew rate (r1) of the wobble component 41 and much smaller than the voltage slew rate (r2) of the pre-pit components 42. As such, most of the pre-pit components 42 in the information signal (wob) will be suppressed by the slew rate control module 341 to result in an effective wobble signal (slew_wob), as shown in FIG. 9. Afterwards, the effective wobble signal (slew_wob) is fed to the band-pass filter 342 for removing the remaining pre-pit components 42. The output of the band-pass filter 42 is then encoded into a digital signal (sd) by the digital encoder 343, which is subsequently fed to the servo circuit 35 such that the servo circuit 35 can control the rotating speed of the spindle motor 32 according to the timing information contained in the digital signal (sd).

Figure 10:
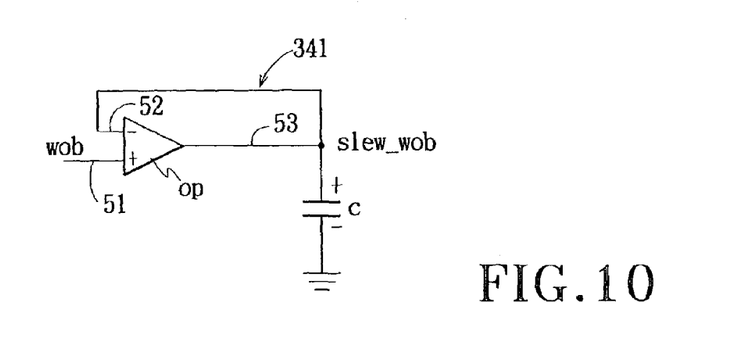
FIG. 10 is a schematic circuit block diagram of the slew rate control module of the preferred embodiment.

Referring to FIG. 10, an exemplary slew rate control module 341 suitable for use in the present invention is shown to include an operational amplifier (op) and a capacitor (c). The operational amplifier (op) has a non-inverting input 51 adapted for receiving the information signal (wob), an output 53 from which the effective wobble signal (slew_wob) can be obtained, and an inverting input 52 coupled to the output 53. The capacitor (c) has a first capacitor terminal coupled to the output 53 of the operational amplifier (op), and a grounded second capacitor terminal. Under ideal conditions, when the voltage signal at the input 51 of the operational amplifier (op) varies at a certain speed, the voltage signal at the output 53 should also vary at the same speed. In practice, due to the internal capacitance of the operational amplifier (op), the rate of change ($\Delta v$) of the output signal voltage requires a certain time period ($\Delta t$) to catch up with the input voltage. Therefore, the operational amplifier (op) can be regarded as a component with a limited slew rate (r) (r=$\Delta v/\Delta t$). In other words, when the voltage slew rate of an input signal is much larger than the slew rate (r) of the operational amplifier (op), the operational amplifier (op) will not have sufficient time to form an output signal that will correspond exactly to an input signal with a large signal variation. Therefore, while an output signal supposed to correspond to the input signal with the large signal variation is still being formed, since the operational amplifier (op) receives another signal-varying component of the input signal, the operational amplifier (op) will only output a certain part of the original input signal. This also means that the slew rate of the components of the output signal will be smaller than the slew rate of the components of the input signal. The component characteristics required of the slew rate control module 341 are thus met. Therefore, in this embodiment, when an operational amplifier (op) having a slew rate (r3) that is larger than the voltage slew rate (r1) of the wobble component 41 and much smaller than the voltage slew rate (r2) of the pre-pit components 42 (r1<r3<r2) is selected, since the variation speed of the output signal cannot catch up with the pre-pit components 42 of the information signal (wob), an effective wobble signal (slew_wob) (as shown in FIG. 9) is formed as the result of suppressing most of the pre-pit components 42, and the purpose of extracting a wobble signal from the information signal (wob) is served. Furthermore, when the load current (I) of the operational amplifier (op) becomes larger, the slew rate (r) will be increased accordingly (I=c×r). Since the slew rate of the wobble component 41 can be calculated from the wobbling amplitude of the groove track 231, by adjusting the magnitude of the load current (I), the slew rate of the operational amplifier (op) can be set to be larger than the slew rate (r1) of the wobble component 41 so as to remove the pre-pit components 42. It should be noted that the slew rate control module 341 only needs to meet the requirement of predetermined slew rate and should not be limited to the implementation of the operational amplifier (op) as disclosed in this embodiment.

As evident from the foregoing, the present invention applies a method of slew rate control to remove pre-pit components and thereby extract an effective wobble signal from an information signal with the use of a simple circuit, which results in the advantages of lower circuit cost and size.

Moreover, although the characteristic of voltage slew rate is applied in this embodiment, if the information signal has the characteristic of current slew rate (that is, the optical pickup device 31 outputs an electrical signal having a current magnitude corresponding to the intensity of the reflected light beam), a current slew rate control can be applied for removing the undesired pre-pit components from the information signal.

It is also worthwhile to note that, although this embodiment is used for the removal of pre-pit components 42 in an information signal (wob), noise signals in the optical disc system attributed to factors, such as interference, vibration, etc., can also be removed by the slew rate control technique utilized in this invention. Therefore, the application of the slew rate control method and module of this invention should not be limited to that disclosed in the preferred embodiment.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A method for jitter enhancement in an optical disc system, the optical disc system generating a signal that includes a wobble component having a first slew rate, and a pre-pit component having a second slew rate larger than the first slew rate, said method comprising the steps of:
   a) providing a slew rate control module having a predetermined slew rate that is larger than the first slew rate and smaller than the second slew rate; and
   b) feeding the signal to the slew rate control module such that the slew rate control module outputs the wobble component of the signal having a slew rate not larger than the predetermined slew rate, and suppresses the pre-pit component of the signal having a slew rate larger than the predetermined slew rate.

2. The method as claimed in claim 1, wherein the slew rate control module includes an operational amplifier having an output from which the component of the signal with a slew rate not larger than the predetermined slew rate can be obtained, a non-inverting input for receiving the signal, and an inverting input coupled to the output.

3. The method as claimed in claim 2, wherein the slew rate control module further includes a capacitor having a first capacitor terminal coupled to the output of the operational amplifier, and a grounded second capacitor terminal.

4. A method for extracting a wobble signal from an information signal in an optical disc system, the information signal including a wobble component having a first slew rate, and a pre-pit component having a second slew rate larger than the first slew rate, said method comprising the steps of:
   a) providing a slew rate control module having a predetermined slew rate that is larger than the first slew rate and smaller than the second slew rate; and
   b) feeding the information signal to the slew rate control module such that the slew rate control module outputs the wobble component of the signal having a slew rate not larger than the predetermined slew rate, and suppresses the pre-pit component of the information signal having a slew rate larger than the predetermined slew rate.

5. The method as claimed in claim 4, wherein the slew rate control module includes an operational amplifier having an output from which the wobble signal can be obtained, a non-inverting input for receiving the information signal, and an inverting input coupled to the output.

6. The method as claimed in claim 5, wherein the slew rate control module further includes a capacitor having a first capacitor terminal coupled to the output of the operational amplifier, and a grounded second capacitor terminal.

7. A method for controlling rotating speed of a spindle motor in an optical disc system, the spindle motor driving an optical disc with a wobbling information track, said method comprising the steps of:
   a) through an optical pickup device, generating an information signal that corresponds to the wobbling information track of the optical disc, the information signal including a wobble component having a first slew rate, and a pre-pit component having a second slew rate larger than the first slew rate;
   b) feeding the information signal to a slew rate control module having a predetermined slew rate that is larger than the first slew rate and smaller than the second slew rate, the slew rate control module outputting the wobble component having a slew rate not larger than the predetermined slew rate, and suppressing the pre-pit component of the information signal having a slew rate larger than the predetermined slew rate; and
   c) feeding the wobble component to a servo circuit to control the rotating speed of the spindle motor accordingly.

8. The method as claimed in claim 7, wherein the slew rate control module includes an operational amplifier having an output from which the wobble signal can be obtained, a non-inverting input for receiving the information signal, and an inverting input coupled to the output.

9. The method as claimed in claim 8, wherein the slew rate control module further includes a capacitor having a first capacitor terminal coupled to the output of the operational amplifier, and a grounded second capacitor terminal.

10. The method as claimed in claim 7, wherein step c) includes the sub-steps of filtering and digitizing the wobble signal prior to feeding to the servo circuit.

11. The method as claimed in claim 10, wherein filtering of the wobble signal is conducted using a band-pass filter.

12. The method as claimed in claim 10, wherein digitizing of the wobble signal is conducted using a digital encoder.

13. A device for jitter enhancement in an optical disc system, the optical disc system generating a signal that includes an effective component having a first slew rate and a noise component having a second slew rate larger than the first slew rate, said device comprising:

a slew rate control module having a predetermined slew rate that is larger than the first slew rate and smaller than the second slew rate, said slew rate control module being adapted to be fed with the signal, outputting the wobble component of the signal having a slew rate not larger than the predetermined slew rate, and suppresses the pre-pit component of the signal having a slew rate larger than the predetermined slew rate.

14. The device as claimed in claim 13, wherein said slew rate control module includes an operational amplifier having an output from which the component of the signal with a slew rate not larger than the predetermined slew rate can be obtained, a non-inverting input adapted for receiving the signal, and an inverting input coupled to said output.

15. The device as claimed in claim 14, wherein said slew rate control module further includes a capacitor having a first capacitor terminal coupled to said output of said operational amplifier, and a grounded second capacitor terminal.

16. A device for extracting a wobble signal from an information signal in an optical disc system, the information signal including a wobble component having a first slew rate, and a pre-pit component having a second slew rate larger than the first slew rate, said device comprising:

a slew rate control module having a predetermined slew rate that is larger than the first slew rate and smaller than the second slew rate, said slew rate control module being adapted to be fed with the information signal, outputting the wobble component of the signal having a slew rate not larger than the predetermined slew rate, and suppresses the pre-pit component of the information signal having a slew rate larger than the predetermined slew rate.

17. The device as claimed in claim 16, wherein said slew rate control module includes an operational amplifier having an output from which the wobble signal can be obtained, a non-inverting input adapted for receiving the information signal, and an inverting input coupled to said output.

18. The device as claimed in claim 17, wherein said slew rate control module further includes a capacitor having a first capacitor terminal coupled to said output of said operational amplifier, and a grounded second capacitor terminal.

* * * * *

UNITED STATES PATENT AND TRADEMARK OFFICE
CERTIFICATE OF CORRECTION

| | |
|---|---|
| PATENT NO. | : 7,054,250 B2 |
| APPLICATION NO. | : 10/358529 |
| DATED | : May 30, 2006 |
| INVENTOR(S) | : Tse-Hsiang Hsu et al. |

Page 1 of 1

It is certified that error appears in the above-identified patent and that said Letters Patent is hereby corrected as shown below:

In column 5, line 26 please replace "(wob) In" with --(wob).  In--

Signed and Sealed this

Ninth Day of January, 2007

JON W. DUDAS
*Director of the United States Patent and Trademark Office*